(12) United States Patent
Moench et al.

(10) Patent No.: US 11,099,259 B2
(45) Date of Patent: Aug. 24, 2021

(54) POLARIZATION DETECTION IMPROVED SENSING

(71) Applicant: TRUMPF Photonic Components GmbH, Ulm (DE)

(72) Inventors: Holger Joachim Moench, Ulm (DE); Matthew John Lawrenson, Eindhoven (NL); Nicholas Walker, Eindhoven (NL); Jan Jasper Van Den Berg, Eindhoven (NL)

(73) Assignee: TRUMPF PHOTONIC COMPONENTS GMBH, Ulm (DE)

( * ) Notice: Subject to any disclaimer, the term of this patent is extended or adjusted under 35 U.S.C. 154(b) by 0 days.

(21) Appl. No.: 16/862,622

(22) Filed: Apr. 30, 2020

(65) Prior Publication Data

US 2020/0256965 A1 Aug. 13, 2020

Related U.S. Application Data

(63) Continuation of application No. PCT/EP2018/079774, filed on Oct. 31, 2018.

(30) Foreign Application Priority Data

Nov. 2, 2017 (EP) ..................................... 17199646

(51) Int. Cl.
*G01S 7/48* (2006.01)
*G01S 7/481* (2006.01)
(Continued)

(52) U.S. Cl.
CPC .............. *G01S 7/481* (2013.01); *G01S 7/499* (2013.01); *G01S 7/4915* (2013.01); *G01S 17/36* (2013.01);
(Continued)

(58) Field of Classification Search
None
See application file for complete search history.

(56) References Cited

U.S. PATENT DOCUMENTS 7,995,191 B1 8/2011 Sandusky
2013/0135453 A1 5/2013 Katsuhiro
(Continued)

FOREIGN PATENT DOCUMENTS

JP H 066381 A 1/1994
JP 2010256138 A 11/2010
(Continued)

OTHER PUBLICATIONS

Kolb, et al.: "Time-of-Flight Cameras in Computer Graphics," *Computer Graphics Forum* 29, 1: 141-159 (Jan. 1, 2010). XP055293365.

*Primary Examiner* — Hovhannes Baghdasaryan
(74) *Attorney, Agent, or Firm* — Leydig, Voit & Mayer, Ltd.

(57) ABSTRACT

A time-of-flight camera module includes a controller, a time-of-flight detector, a laser device, and an optical unit comprising a polarization rotator arranged to rotate a plane of polarized light. The controller is configured to modulate the time-of-flight detector and the laser device in a depth sensing mode. The time-of-flight detector is configured to record depth data of a scene in the depth sensing mode by means of modulated laser light emitted by the laser device and reflected from an object in the scene. The depth data is descriptive of a distance to the object in the scene. The controller is further configured to modulate the time-of-flight detector and the polarization rotator in a surface polarization sensing mode. The time-of-flight detector is configured to record polarization data of the scene in the surface polarization sensing mode by detection light received from the object in the scene after traversing the polarization rotator.

20 Claims, 7 Drawing Sheets

(51) Int. Cl.
  *G06T 7/521*    (2017.01)
  *G01S 17/894*   (2020.01)
  *G01S 7/4915*   (2020.01)
  *G01S 7/499*    (2006.01)
  *G01S 17/36*    (2006.01)

(52) U.S. Cl.
  CPC ............ *G01S 17/894* (2020.01); *G06T 7/521* (2017.01); *G06T 2207/10028* (2013.01)

(56) References Cited

U.S. PATENT DOCUMENTS

| | | |
|---|---|---|
| 2016/0164258 A1 | 6/2016 | Mark et al. |
| 2016/0261844 A1* | 9/2016 | Kadambi ................ G01B 11/24 |
| 2018/0108141 A1* | 4/2018 | Chen ........................ G06T 7/593 |
| 2019/0033461 A1* | 1/2019 | Wingert ................ G06T 7/0006 |
| 2019/0195691 A1* | 6/2019 | Berlow ................... G01S 7/484 |

FOREIGN PATENT DOCUMENTS

| | | | |
|---|---|---|---|
| JP | 2013113793 A | 6/2013 |
| JP | 2013160717 A | 8/2013 |
| JP | 2016525802 A | 8/2016 |
| WO | WO 2012039086 A1 | 3/2012 |

\* cited by examiner

POLARIZATION DETECTION IMPROVED SENSING

CROSS REFERENCE TO RELATED APPLICATIONS

This application is a continuation of International Patent Application No. PCT/EP2018/079774, filed on Oct. 31, 2018, which claims priority to European Patent Application No. EP 17 199 646.5, filed on Nov. 2, 2017. The entire disclosure of both applications is hereby incorporated by reference herein.

FIELD

The disclosure relates to a time-of-flight camera module, a depth camera comprising a time-of-flight camera module, a method of reconstructing a depth image of a scene, and a corresponding computer program product.

BACKGROUND

US 2016/0261844 A1 discloses a 3D imaging system using a depth sensor to produce a coarse depth map, and then uses the coarse depth map as a constraint in order to correct ambiguous surface normals computed from polarization cues. The imaging system outputs an enhanced depth map that has a greater depth resolution than the coarse depth map.

U.S. Pat. No. 7,995,191 B1 discloses scannerless laser range imaging using loss modulation. A scannerless 3-D imaging apparatus is disclosed which utilizes an amplitude modulated cw light source to illuminate a field of view containing a target of interest. Backscattered light from the target is passed through one or more loss modulators which are modulated at the same frequency as the light source, but with a phase delay δ which can be fixed or variable. The backscattered light is demodulated by the loss modulator and detected with a CCD, CMOS or focal plane array (FPA) detector to construct a 3-D image of the target.

SUMMARY

The present disclosure describes time-of-flight camera modules enabling improved quality of depth images.

According to a first aspect, a time-of-flight camera module is provided. The time-of-flight camera module comprises a controller, a time-of-flight detector, a laser device and an optical unit comprising a polarization rotator arranged to preferably continuously rotate a plane of polarized light. The controller is arranged to modulate the time-of-flight detector and the laser device in a depth sensing mode. The time-of-flight detector is arranged to record depth data of a scene in the depth sensing mode by means of modulated laser light emitted by the laser device reflected from an object in the scene. The depth data can be descriptive or indicative of a distance to the object in the scene. Hence, said depth data can be data for determining a distance between the time-of-flight-camera module and the object in the scene. The controller can be adapted to determine the distance to the object in the scene. The controller is further arranged to modulate the time-of-flight detector and the polarization rotator in a surface polarization sensing mode. The time-of-flight detector is further arranged to record polarization data of the scene in the surface polarization sensing mode by means of detection light received from the object in the scene after traversing the polarization rotator. The polarization data can be descriptive of a polarization or polarization angle of the detection light. Hence, said polarization data can be data for determining a polarization of the detection light. The polarization data can comprise different levels/intensities of detection light acquired at different polarization angles. The detection light comprises polarized emitted light emitted by the laser device and the optical unit which is reflected from the object in the scene. The controller can be adapted to determine a surface polarization or polarization based on the polarization of the detection light reflected from the object in the scene.

The time-of-flight camera module may be advantageous in comparison to prior art solution as described by US 2016/0261844 A1:

The polarization modulation angle data collected in the surface polarization sensing mode may be less noisy since the detector enables a cross correlation with the expected modulated reflectance signal.

The approach enables use of the inherent mechanisms of the modulated time-of-flight sensor module in its operation. No separate sensor is needed.

The polarization rotator is a filter/device capable of rotating the plane of received light polarization through a specified/controlled angle which is variable from 0 to PI. For the received light it is necessary to detect light of a single polarization with a controlled angle. The polarization rotator may, for example, comprise a combination of a LCD polarization rotator and linear polarizer which are able to provide such a controlled rotation of the polarization direction of the received light. Equivalently a mechanically rotated linear polarizer may be used or other technology enabling light of only one polarization with defined rotation of the plane of polarization.

Depth sensing mode and the surface polarization sensing mode operate at very different modulation frequencies. The depth sensing polarization frequencies relate to the depth range of the time-of-flight sensor. For a depth range of meters this is around 10-20 MHz. For the polarization detection this will be considerably less and depend on the rotator, (KHz range). The lower frequency range for polarization detection is needed so that the measurement are not affected by different depths of surfaces introducing a delay in the returned reflected light. The two modes may therefore be intelligently combined to generate both depth and polarization data within one time period. It is therefore not necessary to perform the depth sensing mode and the surface polarization sensing mode in subsequent time periods.

Depth data and polarization data may be recorded by means of any memory device comprised by the time-of-flight camera module.

The controller may be arranged to modulate the time-of-flight detector (especially in the surface polarization sensing mode) with a sinusoidal signal. The controller may be further arranged to modulate the polarization rotator with a signal which achieves a rotation of a polarization plane of the polarized detection light synchronized to the sinusoidal signal. The modulation frequency may preferably be the highest rate the polarization rotator works. The polarization rotator may, for example, comprise a linear polarization device and a LCD polarization rotator. The modulation frequency may in this case be, for example, between 100 Hz and 1 kHz. The polarization rotator may be driven by a polarization driver which takes the sinusoidal signal and uses it to generate a corresponding driving voltage to get the corresponding angle of the polarization plane or direction. The time-of-flight detector is modulated with the sinusoidal signal but the polarization rotator is modulated with a signal which achieves a rotation of the plane of polarized light synchronized to the sinusoidal signal (where it goes from 0 to PI during one full cycle).

The controller may be arranged such that in said surface polarization sensing mode the intensity of the laser light emitted by the laser device is constant.

The polarization rotator may alternatively comprise a mechanically rotated linear polarizer film which is equivalent to the combination of the LCD polarization rotator and the linear polarizer. Rotation of the mechanically rotated linear polarizer film may be modulated in similar way as described with respect to the LCD polarization rotator.

The laser device and the optical unit may be arranged such that the emitted light is circular polarized. Laser light emitted by the laser device may be transformed or converted by means of an optical element comprised by the optical unit such that laser light traversing the optical element is circular polarized. The laser device may, for example, be arranged to emit linear polarized laser light and the optical unit may comprise a quarter wave plate arranged to convert the linear polarized laser light to circular polarized emitted light.

Circular polarization improves the detection of diffuse polarization which can be further used to improve quality of the depth image.

The laser device and the optical unit may alternatively be arranged such that the emitted light is linear polarized.

The time-of-flight camera module according to any embodiment described above comprising a linear polarizer may comprise a laser device which is arranged to emit linear polarized laser light. The laser device may be arranged to switch between a first polarization direction and a second polarization direction perpendicular to the first polarization direction. The first polarization direction is aligned to a polarization direction of the linear polarization device.

The laser device may alternatively be arranged to emit linear polarized laser light, wherein the linear polarization device is in this alternative embodiment arranged to switch between a third polarization direction and a fourth polarization direction perpendicular to the third polarization direction. The third polarization direction is aligned to a polarization direction of the laser light. The first polarization direction and third polarization direction may be identical.

The laser light may be preferably emitted via a continuous LCD polarization rotator or an equivalent device, wherein the LCD polarization rotator may be arranged in the emission and the receiving path of the time-of-flight camera module. This means that the polarization planes or directions of emitted light and received light after traversing the LCD polarization rotator are rotated synchronously.

Switching of polarization directions as described in the two alternatives above enables separate detection of diffuse polarization and the combination of diffuse and specular polarization (see explanations provided with respect to FIGS. 1-4 and 7 below).

The laser device may comprise an array of Vertical Cavity Surface Emitting Lasers which are arranged to emit laser light in the near infrared wavelength range. Such a VCSEL arrays may be suited to enable cost effective time-of-flight camera modules.

A depth camera may comprise the time-of-flight camera module according to any embodiment described above. The depth camera further comprises an electrical driver arranged to electrically drive the controller, the time-of-flight detector and the laser device. The depth camera further comprises a reconstruction unit. The reconstruction unit is arranged to provide a depth image of the scene based on the depth data and the polarization data.

According to a second aspect, a method of reconstructing a depth image is provided. The method comprises the steps of: emitting laser light in a depth sensing mode, detecting depth data of an object in a scene by receiving detection light reflected from the object by means of a time-of-flight detector in the depth sensing mode, wherein said depth data is descriptive of a distance to the object in the scene, emitting polarized emitted light in a surface polarization sensing mode, generating detection light by (preferably continuously) rotating a plane of polarized light comprised by received light reflected from the object in the surface polarization sensing mode, detecting polarization data of the object in the scene by receiving the detection light by means of the time-of-flight detector in the surface polarization sensing mode, wherein said polarization data is descriptive of a polarization of the detection light, and reconstructing the depth image of the scene based on the depth data and the polarization data.

The method steps may not necessarily be performed in the sequence described above.

Alternating on some schedule with the depth sensing mode, the surface polarization sensing mode may especially operate as follows (see also FIG. 5 and corresponding description):

The laser device (e.g. VCSEL Array) is illuminated with constant intensity.

A modulated sine wave signal of appropriate frequency is provided to both the polarization rotator (to its electrical driver in order to generate the correct voltages for the change desired) and the time-of-flight detector.

The polarization rotator continuously rotates the angle of polarization synchronously with the modulated signal, changing the angle linearly from 0° to 180° in one full cycle (and then either instantly switching the value to 0° to repeat a cycle or continuing until it reaches its rotation limit at some multiple of 180° and then switching to 0°).

The time-of-flight detector (e.g. sensor array) collects the modulated reflected polarized light data and for each point returns the values of: Phase, Modulation Amplitude and Average Amplitude (see description of FIG. 5).

The values for polarization angle and zenith angle for each point are determined.

The surface normal at each point (with a two angle ambiguity) is determined.

The surface normals are used for the desired purpose, e.g. improvement of depth estimates along with the depth image.

According to a third aspect a computer program product is provided. The computer program product comprises code means which can be saved on at least one memory device comprised by the depth camera described above. The code means are arranged such that the method described above can be executed by means of at least one processing device comprised by the depth camera.

The memory device or the processing device may be comprised by the depth camera (e.g. electrical driver, controller etc.).

The memory device or devices may be any physical device being arranged to store information especially digital information. The memory device may be especially selected out of the group solid-state memory or optical memory.

The processing device or devices may be any physical device being arranged to perform data processing especially processing of digital data. The processing device may be especially selected out of the group processor, microprocessor or application-specific integrated circuit (ASIC).

Further advantageous embodiments are defined below.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

In the Figures, like numbers refer to like objects throughout. Objects in the Figures are not necessarily drawn to scale.

DETAILED DESCRIPTION

Various embodiments will now be described by way of the Figures.

Surface normal data can be inferred from measuring reflected light from a scene through a linear polarizer at a range of angles of the linear polarizer. Polarized light from a diffuse surface illuminated by unpolarized light arises from two mechanisms, specular polarized reflection and diffuse polarized reflection. The first mechanism is discussed with respect to FIGS. 1 and 2. The second mechanism is discussed with respect to FIGS. 3 and 4.

Figure 1:
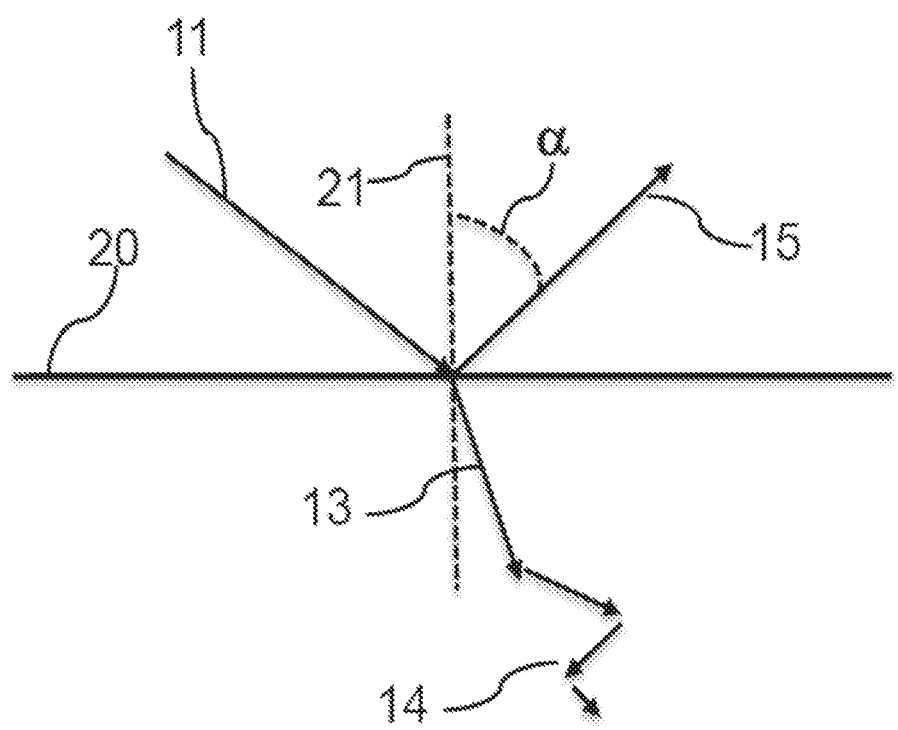
FIG. 1 shows a principal sketch of specular polarized reflection.

FIG. 1 shows a principal sketch of specular polarized reflection. Incident light 11 is specular reflected at a surface given by material interface 20. The material above the material interface 20 may, for example, be air with refractive index of 1.0 and the material below the material interface 20 may, for example, be a material with the refractive index of 1.4. A part of incident light 11 is specular reflected at the material interface 20 resulting in specular reflected light 15 enclosing the same zenith angle with a surface normal 21 of the material interface 20 as the incident light 11. Another part of the incident light 11 is transmitted via the surface of the material interface 20 such that transmitted light 13 is finally scattered within the material.

Figure 2:
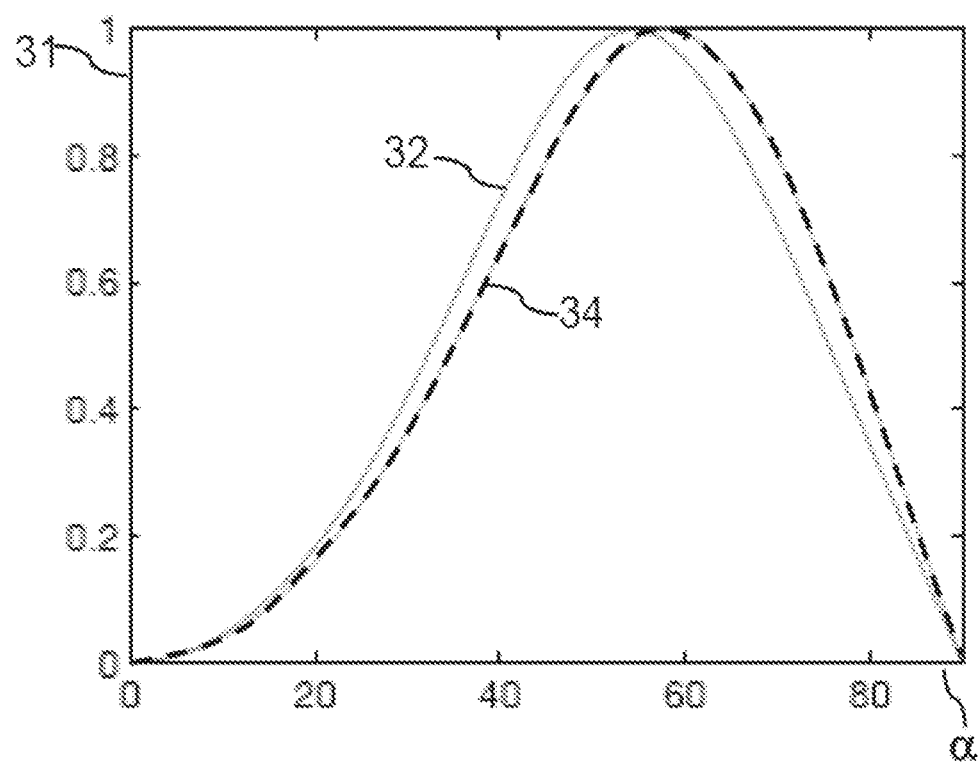
FIG. 2 shows a graph showing dependence of specular polarized reflection on refractive index and surface normal (zenith) angle.

Polarized direct surface reflection results in light of different incident polarizations being reflected differently off the surface of the material interface is. The differences are given by the Fresnel equations for reflection. The surface needs to be reflective, at least to some degree, with a glassy or metallic-like surface. The difference in degree of polarized light reflection is non-monotonic with zenith angle. FIG. 2 shows a graph showing dependence of specular polarized reflection on zenith angle for different refractive indices. The abscissa shows zenith angle α and the ordinate shows the degree of specular polarization 31. Line 32 shows dependence of specular polarization at a refractive index of 1.4 and line 34 shows a slightly different dependence of specular polarization at a refractive index of 1.6.

Figure 3:
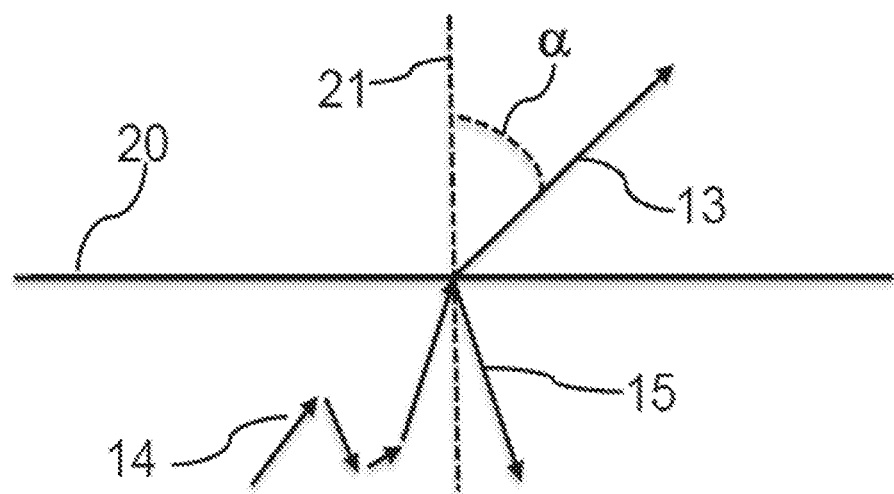
FIG. 3 shows a principal sketch of diffuse polarized reflection.
Figure 4:
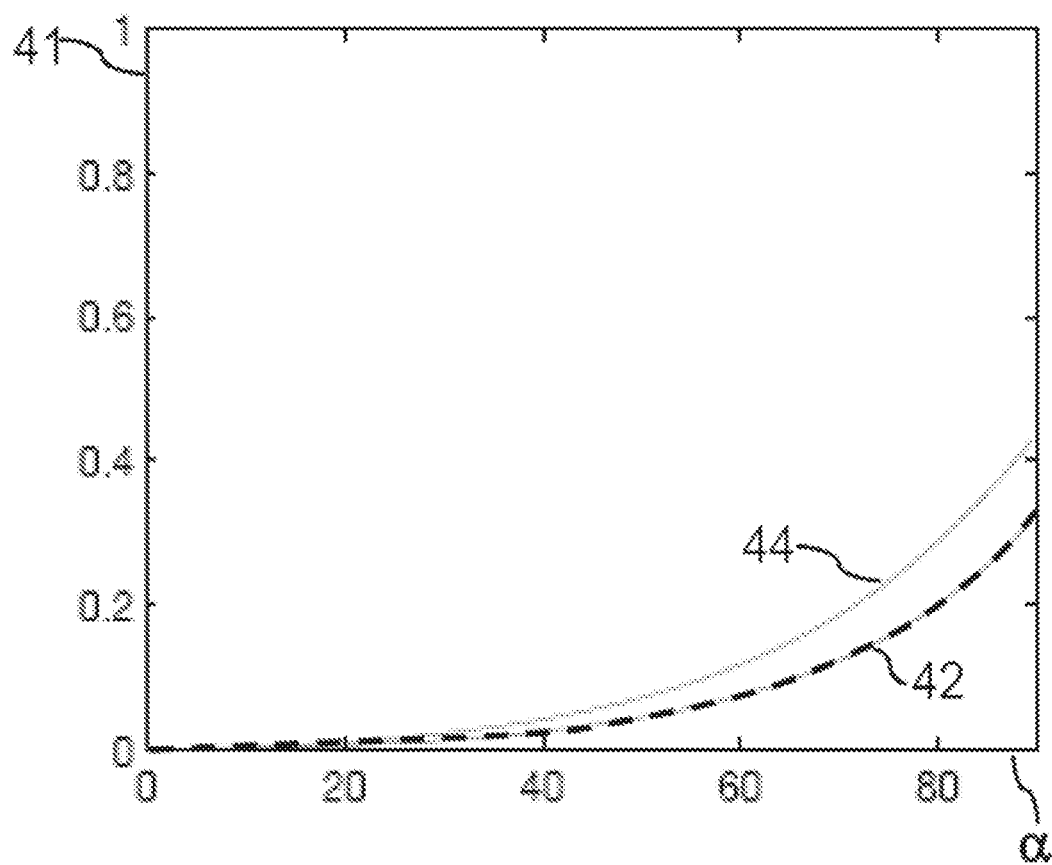
FIG. 4 shows a graph showing dependence of diffuse polarized reflection on refractive index and surface normal (zenith) angle.

FIG. 3 shows a principal sketch of diffuse polarized reflection. A part of the scattered light 14 shown in FIG. 1 may reach the material interface 20 such that transmitted light 13 enter the "air" half space above the material interface 20 and another part of the light is reflected such reflected light 15 is back reflected in the "material" half space below the material interface 20. The transmitted light 13 encloses a zenith angle α with the surface normal 21 of the material interface 20. FIG. 4 shows the degree of diffuse polarization 41 as function of the zenith angle α for material with a refractive index of 1.6 (line 44) and for a material with a refractive index of 1.4.

If reflected light is observed through a polarizer the surface normal can be inferred by determining the two angles:

The polarizer angle, which is the angle of the polarizer with the maximum value of reflected light intensity.

The zenith angle, inferred from an estimate of the material refractive index and the degree of polarization (difference in reflected light intensity between maximum and minimums of polarized light returns, divided by the average intensity of light returns).

Polarized specular reflection can also be determined by measurements using projected polarized light with no linear polarizer on the detector (e.g. camera) since the reflected light remains polarized.

Polarized diffuse reflection is not observable using projected polarized light with no linear polarizer on the camera as this light has become depolarized as its scatters within a surface layer of the material and prior to emission. It only becomes polarized on re-emission.

Since diffuse polarized light is more readily observed, and has a monotonic function with zenith angle α (see FIG. 4), practically determining surface normals using polarized light reflection differences requires a variable angle linear polarizer in front of the observing camera. However, polarized illumination retains a role in determining specular reflective polarization, and in improving the results, for example, by using projected circularly polarized light (see discussion with respect to FIG. 6).

Surface normal data obtained from measurement of surface normals determined using a reflectance polarization method (in this case in visual light 2D camera) can be used to increase the accuracy of 3D depth data (see, for example, US 2016/0261844 A1 identified above which is incorporated by reference). The depth data is used to:

1. Solve for the fact that two surface normal angles (an angle as well as that angle plus PI degrees) are consistent with a set of polarizer and zenith angle estimates.
2. Solve for the absolute depth that different objects whose surfaces are unconnected are set, since relative depth from surface normal data alone can only be found by integrating over a connected surface.

The surface normal data corrects for the uncertainties and noise in connected surface depth estimates from the depth camera. Surface polarization data, e.g. degree of specular reflection, is useful for determining the visual properties of surfaces which can be used for graphical VR rendering.

Smooth reflective surfaces and diffuse surfaces can be discriminated, and the refractive index of partially transparent objects can be estimated.

In a sensor for modulated time-of-flight measurement, the illumination of the scene is modulated in intensity with a high frequency sine wave and the detector is modulated with the same sine wave frequency and a cross correlation is performed between the modulation and sensed data with the results at different phase offsets going to different "bins". Using the data in these "bins" the phase, modulation amplitude and offset amplitude can be determined using simple maths. The phase (along with the modulation frequency) gives the depth, the modulation amplitude the reflectance of the image and the offset amplitude the level of ambient light.

Figure 5:
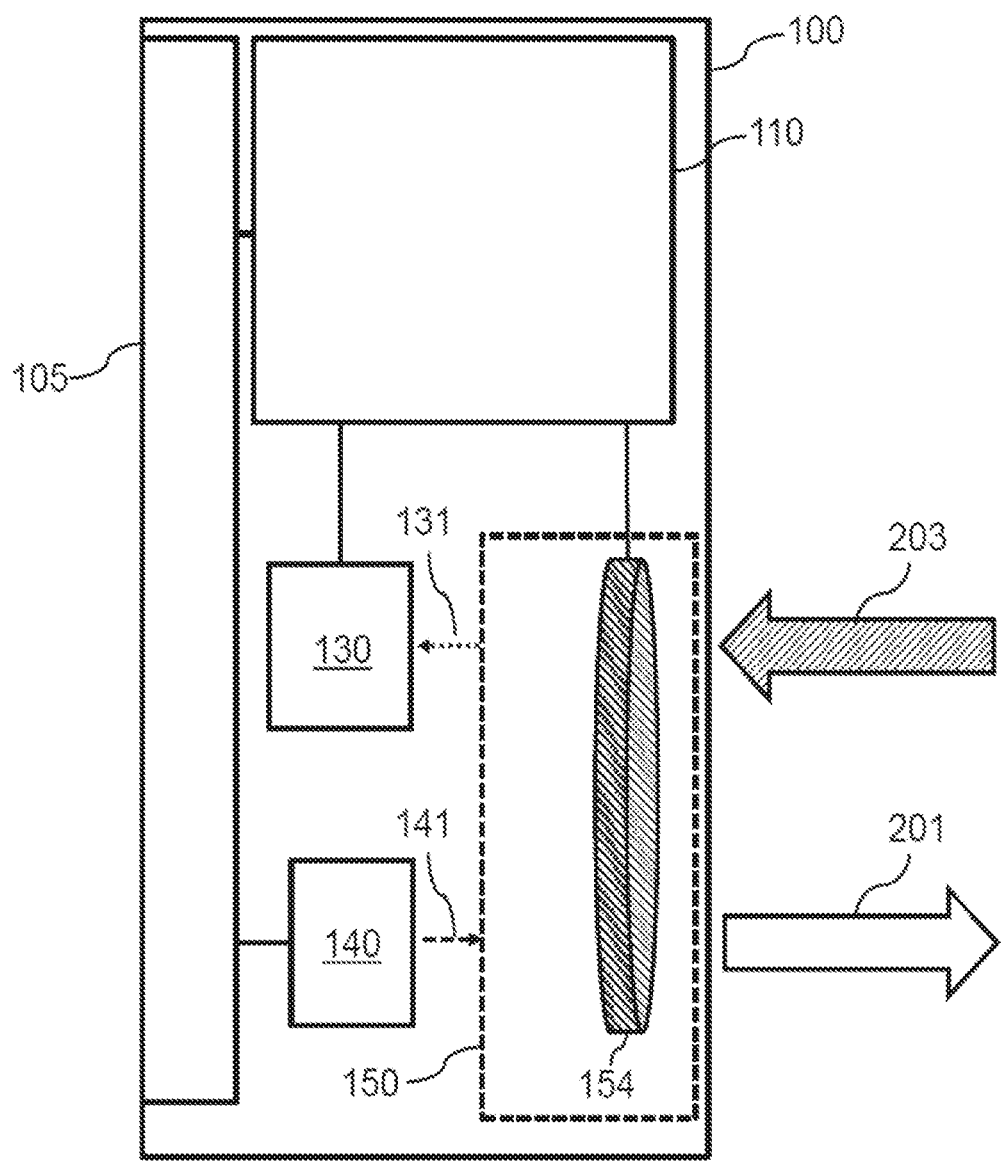
FIG. 5 shows a principal sketch of a time-of-flight camera module.

FIG. 5 shows a principal sketch of a time-of-flight camera module 100. The time-of-flight camera module 100 comprises a controller 110, a time-of-flight detector 130, a laser device 140, an optical unit 150 and an optional data and/or electrical interface 105. The controller 110 is arranged to control light emission of the laser device 140 and especially to modulate the time-of-flight detector 130 and the optical unit 150. The time-of-flight detector 130 has to be arranged to operate at high modulation frequency for that estimation and low modulation frequency for surface polarization sensing (see below). The time-of-flight detector 130 comprises in this embodiment a Single Photon Avalanche Diode (SPAD) array. The optical unit 150 comprises a polarization rotator which is in this case a mechanically rotated linear polarizer film 154. Generally, any linear polarization filter technology can be used in the reception path (received light 203) which enables to continuously rotate and thus enable continuous selection of the plane of polarized light. The optical unit 150 may comprise further optical elements for adapting the optical path of emitted light 201 and received light 203. The laser device 140 comprises a laser or lasers (e.g. array of edge emitters) and optionally an electrical driver which is arranged to electrically drive the laser with an electrical driving current in accordance with the respective detection mode (see below). The laser device 140 may alternatively be electrically driven via interface 105. The laser emits unpolarized laser light 140. The laser light 140 traverses the mechanically rotated linear polarizer film 154 such that the rotating linearly polarized emitted light 201 leaves the time-of-flight camera module 100. The emitted light 201 is reflected (diffuse and specular) back by objects in the scene which are illuminated by the time-of-flight camera module 100 such that received light 203 traverses the mechanically rotated linear polarizer film resulting in detection light 131 which is detected by the time-of-flight detector 130. The controller 110 is arranged to modulate the laser device 140, time-of-flight detector 130 and the rotation of the mechanically rotated linear polarizer film. The controller 110 further operates in two modes:

1 Depth sensing mode—this is the usual time-of-flight camera mode using intensity modulated laser light 141 at a high modulation frequency, and with the time-of-flight detector 130 modulated at the same frequency. Phase shift, modulation depth and intensity offset are collected for each point in the image of the scene and used to produce a depth and a reflectance image.

2 Surface polarization sensing mode—here the intensity of the laser light 141 emitted by the laser device 140 is constant but, synchronized with a low frequency time-of-flight detector 130 modulation, the rotation of polarization rotator (mechanically rotated linear polarizer film 154 embodiment discussed with respect to FIG. 5) results in a sine wave modulation of the reflected light intensity (due to different levels of reflected light at each polarization angle) from each point in the scene which depends on its surface normal (and to some degree its refractive index as discussed above).

The polarization rotator operates in the surface polarization sensing mode synchronously with the time-of-flight detector 130, continuously rotating the angle of the planarization rotator in front of the time-of-flight detector 130 from 0° through 180°. The time-of-flight detector 130 produces a cross correlation with the sine wave provided by the controller 110 and the returned light intensity of detection light 131 (which will be also a sine wave modulated by the polarization differences at each point).

4 values may be generated at 4 different equally spaced phase offsets: A0, A1, A2 and A3.

Polarization angle=Phase=atan((A3−A1)/(A0−A2))
Modulation amplitude=sqrt((A3−A1)2+(A0−A2)2)
Average amplitude=(A0+A1+A2+A3)/4
Degree of Polarization=Modulation amplitude/Average amplitude
zenith angle=f(Degree of Polarization) where f is a function which recovers the zenith angle from the degree of polarization.

It requires an estimate of the material refractive index (most materials range from 1.4 to 1.6). Surface normals can be determined from the polarization angle and the zenith angle (with an ambiguity since two surface normal angles are possible values). The measurement data which is recorded in a memory device of the controller 110 can be used to improve image quality of a depth image provided by means of a depth camera 300 coupled with the time-of-flight camera module 100. The controller 110 may, for example, be arranged to provide the measurement data to an external data processing unit which may be connected by means of the interface 105. The polarization rotator may be switched off in the depth sensing mode.

Figure 6:
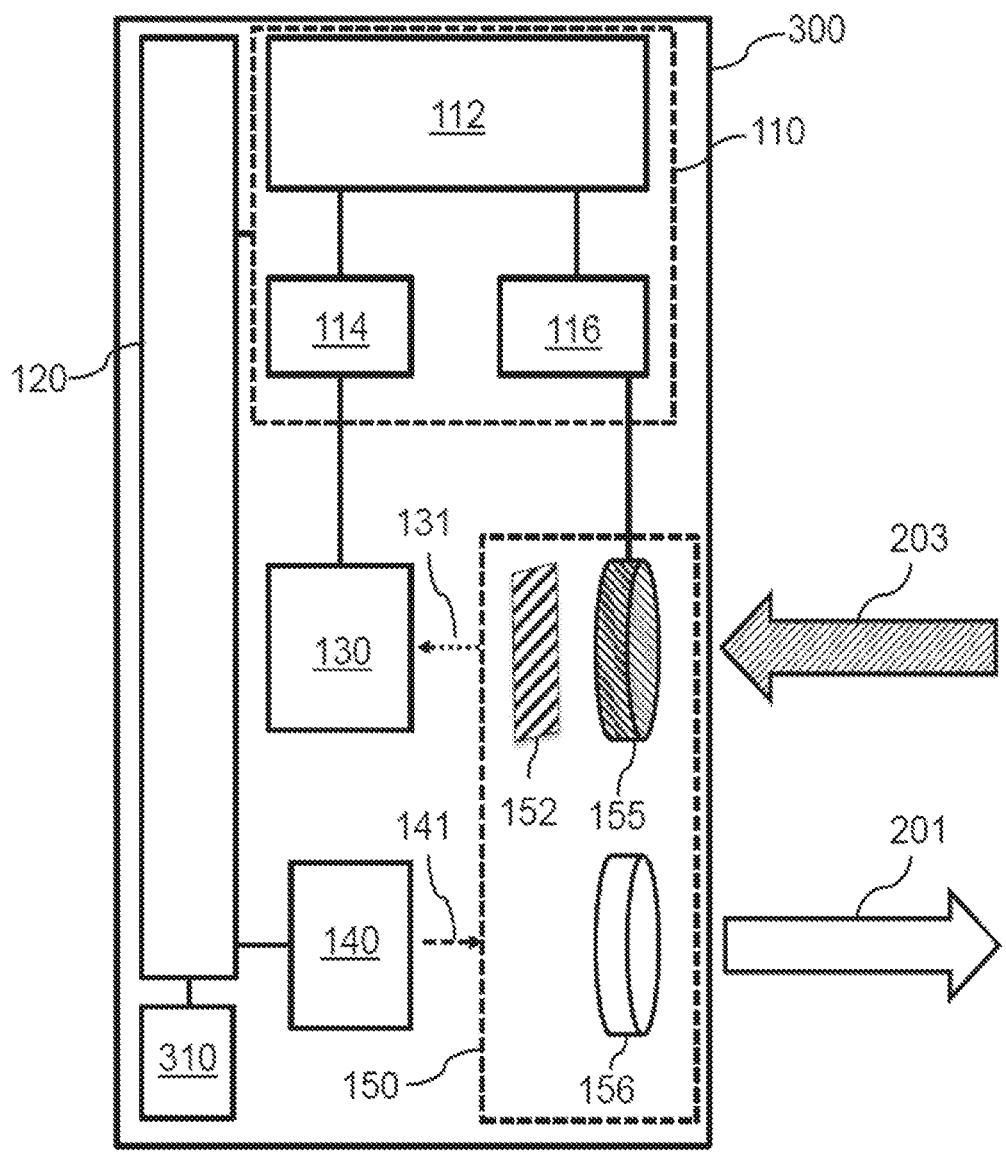
FIG. 6 shows a principal sketch of a first depth camera.

FIG. 6 shows a principal sketch of a first depth camera. The first depth camera 300 comprises the parts or components of the time-of-flight camera module 100 described with respect to FIG. 5 and an electrical driver 120 as well as a reconstruction unit 310 arranged to provide image data based on data recorded in the depth sensing mode and the surface polarization sensing mode described above with respect to FIG. 5. The electrical driver 120 is arranged to electrically drive controller 110, laser device 140 and reconstruction unit 310. The controller 110 comprises a modulator 112, a phase offset device 114 and a polarization driver 116. The modulator 112 is arranged to provide the modulation in accordance with the depth sensing mode and surface polarization sensing mode as described above. The phase offsets device 114 is arranged to determine the, for example, the four equally spaced phase offsets described with respect to FIG. 5. The polarization driver 116 is a voltage driver for driving an LCD polarization rotator 155 comprised by optical unit 150 in accordance with the modulation signals provided by modulator 112. The optical unit 150 further comprises a linear polarizer 152 which is arranged between the LCD polarization rotator 155 and the time-of-flight detector 130. The polarization direction of linear polarizer 152 is arranged to enable optimal rejection of ambient light (e.g. from the sun). The LCD polarization rotator 155 is a special kind of continuous polarization angle rotator arranged to change the polarization angle from 0° to 180° in one full cycle of the modulation provided by means of the modulator 112 and the polarization driver 116. The polarization rotator comprises in this embodiment the combination of LCD polarization rotator 155 and linear polarizer 152. The laser device 140 is a VCSEL array emitting linear polarized laser light 141 in the near infrared wavelength range (especially between 800 nm and 1200 nm). The laser light 141 traverses a quarter wave plate 156 comprised by optical unit 150 such that circular polarized emitted light 201 is emitted by the depth camera 300. The received light 203 comprises specularly and diffusely reflected emitted 201. A polarization direction of polarized light comprised by the received light 203 is continuously rotated by means of the LCD polarization rotator 155 which is arranged in the reception part of depth camera 300. Signal strength of the detection light 131 received by the time-of-flight detector 130 depends on the modulation of the time-of-flight detector 130 which is aligned with the modulation of the continuous LCD polarization rotator 155 similar as described with respect to FIG. 5. Furthermore, the relative direction of the polarization provided by the LCD polarization rotator 155 and the known polarization direction of the linear polarizer 152 have to be taken into account. The time-of-flight detector 130 collects the detection light 131 and the controller 110 determines based on the modulated reflected polarized light data and for each point returns the values of: Phase, Modulation Amplitude and Average Amplitude. The controller 110 determines the values for polarization angle and zenith angle for each point and the surface normal at each point (with a two angle ambiguity) is determined.

The surface normals are used by means of the reconstruction unit 310 for the desired purpose, e.g. improvement of depth estimates along with the depth image. The reconstruction unit 310 may, for example, be arranged to apply an algorithm ('Surface Normal Estimation Algorithm') for inferring the surface normal of an observed point from the outputs of the modulated time-of-flight detector 130 operating to collect the polarized light data. The reconstruction unit 310 may be further arranged to apply an algorithm ('Depth Improvement Algorithm') for improving the depth data using the surface normal data. The reconstruction unit 310 may optionally be arranged to apply an algorithm ('Surface Property Visualization Algorithm') for inferring refractive index and surface reflectance properties of the observed surfaces to enhance graphical representations of the observed scene. The software code comprising one or more of the algorithms may be stored in the memory device and executed by a processing device comprised by the reconstruction unit 310 or the depth camera 300.

Figure 7:
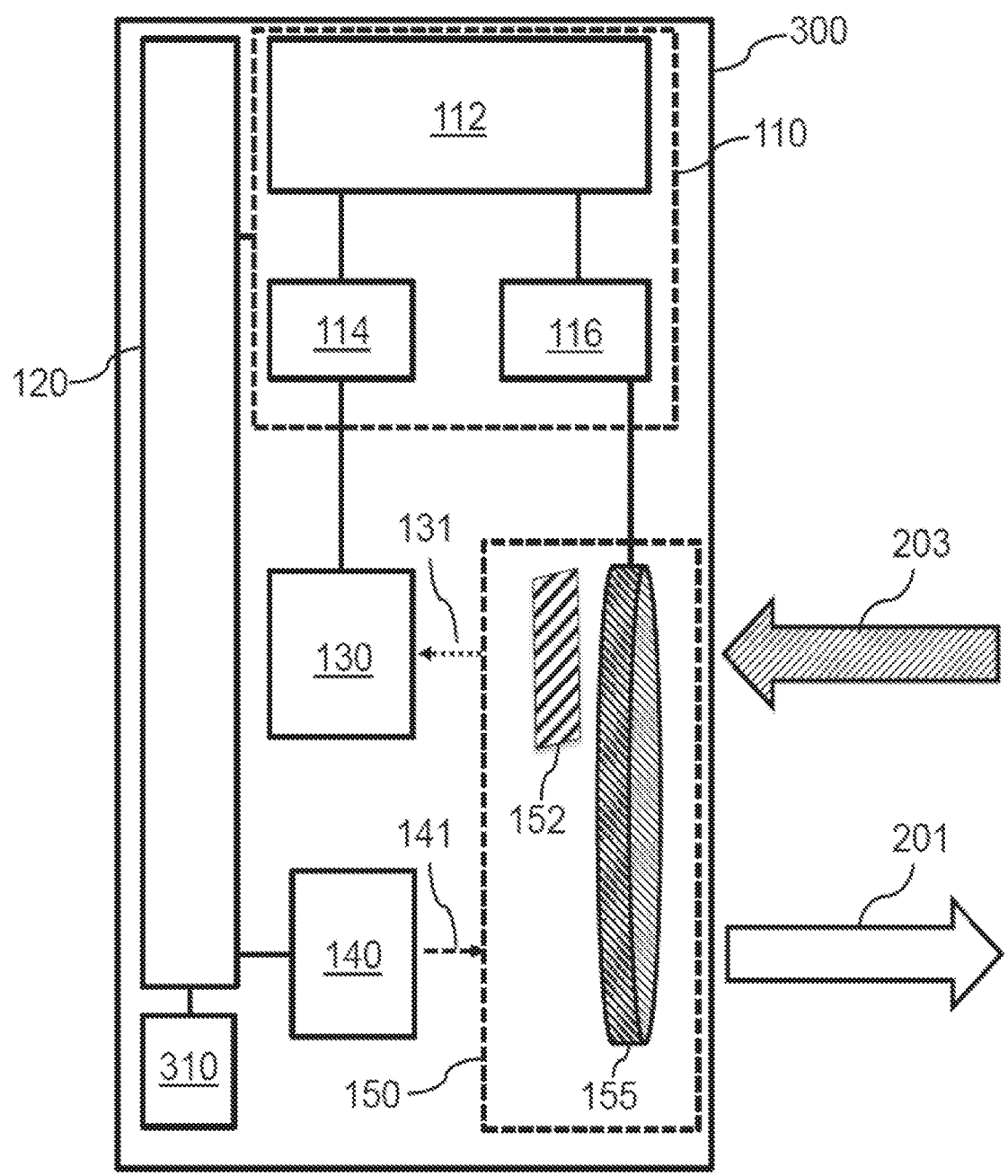
FIG. 7 shows a principal sketch of a second depth camera.

FIG. 7 shows a principal sketch of a second depth camera 300. The second depth camera 300 is up to the optical unit 150 very similar to the first depth camera 300 discussed with respect to FIG. 6. The laser device 140 is arranged to emit linear polarized laser light 141. The optical unit 150 comprises an LCD polarization rotator 155 and a linear polarizer 152 similar as described with respect to FIG. 6. The LCD polarization rotator 155 is in contrast to the embodiment discussed with respect to FIG. 6 arranged in the emission and the reception path the second depth camera 300. The LCD polarization rotator 155 is therefore arranged to continuously and simultaneously rotate the polarization direction of the emitted light 201 and received light 203 in the surface polarization sensing mode. The LCD polarization rotator 155 may be switched off in the depth sensing mode. The polarization direction of the linear polarized VCSEL array may be aligned with the polarization direction of the linear polarizer 152. The alignment of the polarization enables detection of specular and diffuse polarization of the time-of-flight detector 130 in the surface polarization sensing mode. The polarization direction of the linear polarized VCSEL array may alternatively be arranged perpendicular to the polarization direction of linear polarizer 152. The perpendicular or crossed angle arrangement enables detection of diffuse polarization only. This arrangement may be preferred in comparison to the aligned polarization directions to eliminate specular reflection and therefore more cleanly recover the diffuse polarization. This approach also reduces other reflected light issues such as excessive reflections from road sign retroreflectors.

The laser device 140 may alternatively be arranged to switch between the two polarization states. The surface polarization sensing mode would in this case be performed twice, once with the laser device 140 polarization angle the same as the linear polarizer 152 angle ("Aligned angle sensing mode") and once with the laser device 140 polarization angle at 90 degrees to the Linear Polarizer angle ("Crossed angle sensing mode"). The surface normals and surface properties (including degree of specular reflectance) can in this embodiment estimated using both specular and diffuse polarization. The laser device 140 may be able to switch between polarization angles or may comprise an optical element (e.g. LCD polarization rotator) enabling both polarization directions. Alternatively, the polarization direction of the linear polarizer 152 may be switched to enable the aligned angle sensing mode and the crossed angle sensing mode. The measurement data may be extracted and processed by controller 110 and reconstruction unit 310 similar as described with respect to FIG. 6.

The controller 110, the laser device 140, the optical unit 150 and the time-of-flight detector 130 may alternatively be arranged to determine depth data and polarization data simultaneously. Since the depth sensing mode and the surface polarization sensing mode operate at very different modulation frequencies the two modes can be intelligently combined to generate both depth and polarization data. For example, the laser device 140 can be modulated in intensity at a high frequency and the optical device 150 at a low frequency and one set of sensors of the time-of-flight detector 130 (modulated at high frequency) collect the depth information whilst another set of sensors of the time-of-flight detector 130 (modulated at low frequency) simultaneously collect the polarization data.

The reconstruction unit 310 may, for example, be arranged to provide an improved depth image based on the processed measurement data in accordance with any option described with respect to FIG. 6.

Figure 8:
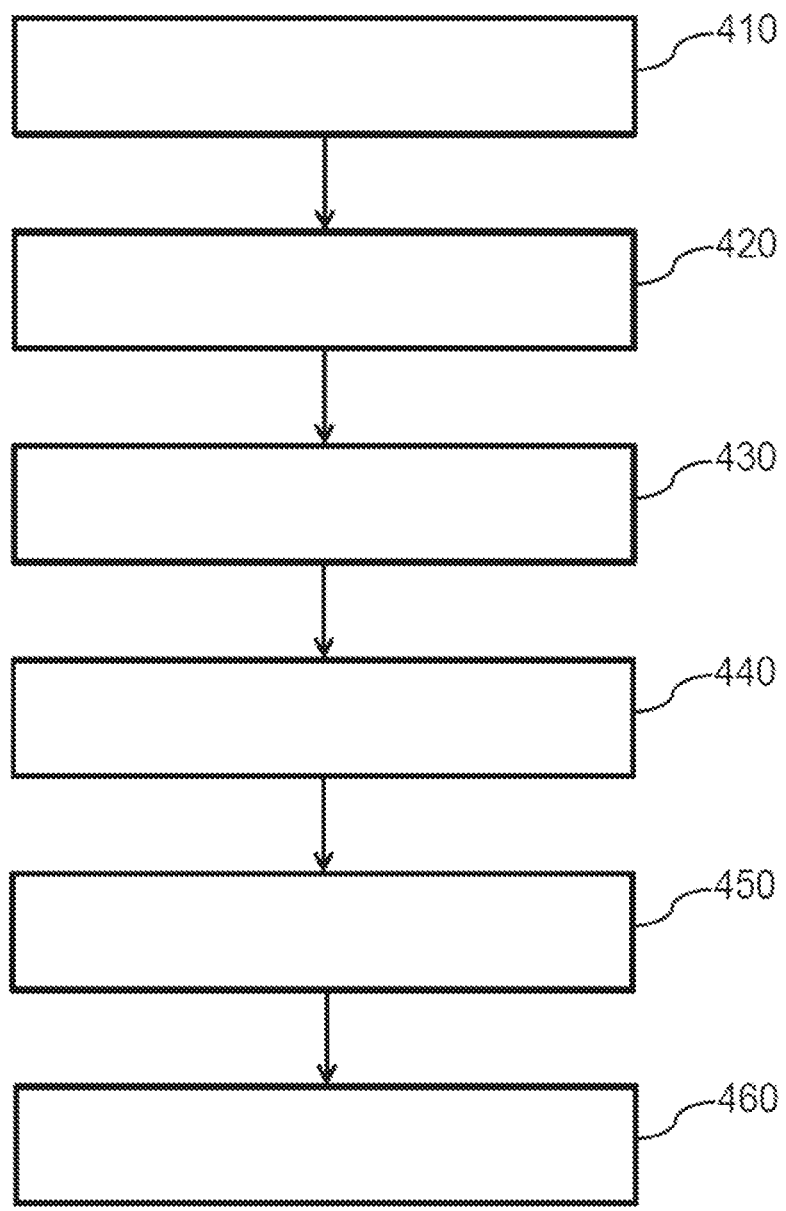
FIG. 8 shows a principal sketch of a method of reconstructing a depth image.

FIG. 8 shows a principal sketch of a method of reconstructing a depth image. In step 410 laser light 141 is emitted in a depth sensing mode. Depth data of an object in a scene is detected in step 420 by receiving detection light reflected from the object by means of a time-of-flight detector in the depth sensing mode. Polarized emitted light 201 is emitted in step 430 in a surface polarization sensing mode. In step 440 detection light 131 is generated by (preferably continuously) rotating a plane of polarized light comprised by received light 203 reflected from the object in the surface polarization sensing mode. Polarization data of the object in the scene is detected in step 450 by receiving the detection light 131 by means of the time-of-flight detector 130 in the surface polarization sensing mode. The depth image of the scene is reconstructed in step 460 based on the depth data and the polarization data.

The disclosure described above enables the following measurements:

(i) Detection of polarization angle of reflected light.
(ii) Separation of diffuse and specular reflected light polarization.

This can then be used to:

(i) Improve quality of depth images, by using data to calculate surface normal (ii) Determine surface properties for better Virtual Reality rendering.

(iii) Optimally filter incoming polarized light, e.g. to minimize glare from reflections Additionally, the disclosure enables this functionality into a time-of-flight camera or depth camera which is based on, for example, VCSEL illuminators and SPAD time-of-flight sensors without the need of an additional separate sensor (e.g. standard camera).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 11 incident light
13 transmitted light
14 scattered light
15 specular reflected light
20 material interface
21 surface normal
31 degree of specular polarization
32 specular polarization at refractive index of 1.4
34 specular polarization at refractive index of 1.6
41 degree of diffuse polarization
42 diffuse polarization at refractive index of 1.4
44 diffuse polarization at refractive index of 1.6
100 time-of-flight camera module
105 interface
110 controller
112 modulator
114 phase offset device
116 polarization driver
120 electrical driver
130 time-of-flight detector
131 detection light
140 laser device
141 laser light
150 optical unit
152 linear polarization device
154 mechanically rotated linear polarizer film
155 LCD polarization rotator
156 quarter wave plate
201 emitted light
203 received light
300 depth camera
310 reconstruction unit
410 emitting laser light
420 detecting depth data
430 emitting polarized light
440 generating detection light
450 detecting polarization data
460 reconstructing depth image
α zenith angle

The invention claimed is:

1. A time-of-flight camera module, comprising:
a controller;
a time-of-flight detector;
a laser device; and
an optical unit comprising a polarization rotator arranged to rotate a plane of polarized light,
wherein the combination of the controller, the time-of-flight detector, the laser device, and the optical unit comprising the polarization rotator are configured to collectively operate in multiple modes of operation, the modes of operation including a depth sensing mode and a surface polarization sensing mode,
wherein the controller is configured to operate the time-of-flight detector and the laser device in the depth sensing mode by synchronizing the time-of-flight detector with modulated laser light emitted by the laser device, the laser light emitted by the laser device being modulated at a first frequency,
wherein the time-of-flight detector is configured to record depth data of a scene in the depth sensing mode by means of the modulated laser light emitted by the laser device and reflected from an object in the scene, wherein said depth data is descriptive of a distance to the object in the scene;
wherein the controller is further configured to operate the same time-of-flight detector, the same laser device, and the polarization rotator in the surface polarization sensing mode by synchronizing the time-of-flight detector with a signal used to modulate, at a second frequency lower than the first frequency, the polarization rotator so as to achieve a rotation of a polarization plane of the polarized detection light;
wherein the time-of-flight detector is configured to record polarization data of the scene in the surface polarization sensing mode by detection light received from the object in the scene after traversing the polarization rotator,
wherein the polarization data is descriptive of a polarization of the detection light,
wherein the detection light comprises polarized emitted light emitted by the same laser device and the optical unit which is reflected from the object in the scene, and
wherein the depth sensing mode and the surface polarization mode are combined to generate both depth data and polarization data during a single time period.

2. The time-of-flight camera module according to claim 1, wherein the controller is configured to operate the time-of-flight detector with a sinusoidal signal, and wherein the signal used to modulate the polarization rotator so as to achieve a rotation of a polarization plane of the polarized detection light is synchronized with the sinusoidal signal.

3. The time-of-flight camera module according to claim 1, wherein in the surface polarization sensing mode the intensity of the laser light emitted by the laser device is constant.

4. The time-of-flight camera module according to claim 1, wherein the polarization rotator comprises a linear polarization device and a LCD polarization rotator.

5. The time-of-flight camera module according to claim 1, wherein the polarization rotator comprises a mechanically rotated linear polarizer film.

6. The time-of-flight camera module according to claim 1, wherein the laser device and the optical unit are arranged such that the emitted light is circular polarized.

7. The time-of-flight camera module according to claim 6, wherein the laser device is arranged to emit linear polarized laser light, and wherein the optical unit comprises a quarter wave plate arranged to convert the linear polarized laser light to circular polarized emitted light.

8. The time-of-flight camera module according to claim 1, wherein the laser device and the optical unit are arranged such that the emitted light is linear polarized.

9. The time-of-flight camera module according to claim 4, wherein the laser device and the optical unit are arranged such that the emitted light is linear polarized,
  wherein the laser device is arranged to emit linear polarized laser light,
  wherein the laser device is arranged to switch between a first polarization direction and a second polarization direction perpendicular to the first polarization direction, and
  wherein the first polarization direction is aligned to a polarization direction of the linear polarization device.

10. The time-of-flight camera module according to claim 4, wherein the laser device and the optical unit are arranged such that the emitted light is linear polarized,
  wherein the laser device is arranged to emit linear polarized laser light,
  wherein the linear polarization device is arranged to switch between a third polarization direction and a fourth polarization direction perpendicular to the third polarization direction, and
  wherein the third polarization direction is aligned to a polarization direction of the laser light.

11. The time-of-flight camera module according to claim 9, wherein the laser device is arranged to emit the laser light through the LCD polarization rotator.

12. The time-of-flight camera module according to claim 1, wherein the laser device comprises an array of Vertical Cavity Surface Emitting Lasers.

13. A depth camera comprising:
  the time-of-flight camera module according to claim 1,
  an electrical driver arranged to electrically drive the controller, the time-of-flight detector and the laser device, and
  a reconstruction unit, wherein the reconstruction unit is arranged to provide a depth image of the scene based on the depth data and the polarization data.

14. A method of reconstructing a depth image, the method comprising:
  emitting, by a laser device, laser light in a depth sensing mode,
  operating, by a controller in a depth sensing mode, a time-of-flight detector and the laser device, the laser light emitted by the laser device in the depth sensing mode being modulated at a first frequency,
  detecting, in the depth sensing mode, depth data of an object in a scene by receiving, by a time-of-flight detector, first detection light reflected from the object, wherein the depth data is descriptive of a distance to the object in the scene,
  emitting, by the same laser device, polarized laser light in a surface polarization sensing mode,
  operating, by the same controller in the surface polarization sensing mode, the same time-of-flight detector and a polarization rotator by synchronizing the time-of-flight detector with a signal used to modulate, at a second frequency lower than the first frequency, the polarization rotator so as to achieve a rotation of a polarization plane of the polarized detection light,
  detecting, in the surface polarization sensing mode, polarization data of the object in the scene by receiving, by the time-of-flight detector, second detection light, wherein the second detection light is generated by rotating, by the polarization rotator, a plane of polarized light comprised by received light reflected from the object in the surface polarization sensing mode, and wherein the polarization data is descriptive of a polarization of the second detection light, and
  reconstructing the depth image of the scene based on the depth data and the polarization data,
  wherein the combination of the controller, the time-of-flight detector, the laser device, and the optical unit comprising the polarization rotator are configured to collectively operate in multiple modes of operation, the modes of operation including the depth sensing mode and the surface polarization sensing mode.

15. A computer program product comprising code stored on at least one memory device, wherein the code, when executed by a processing device, is configured to cause the processing device to carry out the method according to claim 14.

16. A time-of-flight camera module, comprising:
  a controller;
  a time-of-flight detector;
  a laser device; and
  an optical unit comprising a polarization rotator arranged to rotate a plane of polarized light,
  wherein the combination of the controller, the time-of-flight detector, the laser device, and the optical unit comprising the polarization rotator are configured to collectively operate in multiple modes of operation, the modes of operation including a depth sensing mode and a surface polarization sensing mode,
  wherein the controller is configured to operate the time-of-flight detector and the laser device in the depth sensing mode,
  wherein the time-of-flight detector is configured to record depth data of a scene in the depth sensing mode by means of modulated laser light emitted by the laser device and reflected from an object in the scene, wherein said depth data is descriptive of a distance to the object in the scene;
  wherein the controller is further configured to operate the same time-of-flight detector, the same laser device, and the polarization rotator in the surface polarization sensing mode,
  wherein the time-of-flight detector is configured to record polarization data of the scene in the surface polarization sensing mode by detection light received from the object in the scene after traversing the polarization rotator, wherein the polarization data is descriptive of a polarization of the detection light, wherein the detection light comprises polarized emitted light emitted by the same laser device and the optical unit which is reflected from the object in the scene, wherein the controller is configured to operate the time-of-flight detector with a first signal, wherein the controller is configured to operate the polarization rotator with a second signal which achieves a rotation of a polarization plane of the polarized detection light synchronized to the first signal, wherein the controller is further configured to operate the time-of-flight detector and the laser device in the depth sensing mode by synchronizing the time-of-flight detector with the modulated laser light emitted by the laser device, wherein the laser light emitted by the laser device is modulated at a first frequency and the polarization rotator is modulated at a second frequency, wherein the first frequency is higher than the second frequency, and wherein the depth sensing mode and the surface polarization mode are combined to generate both depth data and polarization data during a single time period.

17. The time-of-flight camera module according to claim 2, wherein the time-of-flight detector is configured to produce a cross correlation with the sinusoidal signal and the returned light intensity of the detection light.

18. The time-of-flight camera module according to claim 1, wherein the first frequency is in a MHz range and the second frequency is in a KHz range.

19. The time-of-flight camera module according to claim 16, wherein the first signal is a sinusoidal signal.

20. The time-of-flight camera module according to claim 16, wherein the first frequency is in a MHz range and the second frequency is in a KHz range.

* * * * *